United States Patent
Bostoen et al.

(10) Patent No.: US 12,418,497 B2
(45) Date of Patent: Sep. 16, 2025

(54) METHOD AND APPARATUS FOR BANDWIDTH ALLOCATION IN A SLICED NETWORK

(71) Applicant: Nokia Solutions and Networks Oy, Espoo (FI)

(72) Inventors: Tom Bostoen, Antwerp (BE); Benoit Drooghaag, Ophain-Bois-Seigneur-Isaac (BE)

(73) Assignee: Nokia Solutions and Networks Oy, Espoo (FI)

( * ) Notice: Subject to any disclaimer, the term of this patent is extended or adjusted under 35 U.S.C. 154(b) by 29 days.

(21) Appl. No.: 18/508,431

(22) Filed: Nov. 14, 2023

(65) Prior Publication Data

US 2024/0171524 A1 May 23, 2024

(30) Foreign Application Priority Data

Nov. 17, 2022 (EP) .................................. 22208164

(51) Int. Cl.
*H04L 47/78* (2022.01)
*H04L 47/62* (2022.01)
*H04L 47/70* (2022.01)
*H04L 47/80* (2022.01)

(52) U.S. Cl.
CPC .......... *H04L 47/781* (2013.01); *H04L 47/623* (2013.01); *H04L 47/808* (2013.01); *H04L 47/826* (2013.01)

(58) Field of Classification Search
CPC ... H04L 47/623; H04L 47/808; H04L 47/826; H04L 47/781
See application file for complete search history.

(56) References Cited

U.S. PATENT DOCUMENTS

2022/0232584 A1* 7/2022 Drooghaag ........... H04W 74/08

* cited by examiner

*Primary Examiner* — Suraj M Joshi
(74) *Attorney, Agent, or Firm* — Harness, Dickey & Pierce, P.L.C.

(57) ABSTRACT

In one embodiment, the apparatus includes at least one memory configured to store instructions; and at least one processor configured to execute the instructions and cause the apparatus to perform, obtaining, a first parameter indicating a contention situation of a first network including a plurality of virtual network operators, VNOs, as participants; obtaining, a second parameter indicating a historical bandwidth utilization of respective one of the VNOs; determining, based on the first parameter and the second parameter, a first scheduler parameter and/or a first shaper parameter, for being provided to an output of the apparatus, wherein the first scheduler parameter and/or the first shaper parameter is related to allocating bandwidth to the one of the VNOs; transmitting, to a controller of the one of the VNOs, the first scheduler parameter and/or the first shaper parameter.

20 Claims, 5 Drawing Sheets

METHOD AND APPARATUS FOR BANDWIDTH ALLOCATION IN A SLICED NETWORK

CROSS-REFERENCE TO RELATED APPLICATIONS

This application claims priority to and the benefit of European Patent Application No. 22208164.8 filed on Nov. 17, 2022, the entire contents of each of which are incorporated herein by reference.

FIELD OF THE INVENTION

Various example embodiments relate to bandwidth allocation, specifically to bandwidth allocation in a sliced network.

BACKGROUND

To maximize the utilization of their passive optical networks (PONs), communication service providers (CSPs) are offering service-level agreements (SLAs) to their residential subscribers promising downstream peak data rates of one gigabit per second and more, even without capping the transmitted data volume. With such an extreme overbooking, one heavy user downloading at the peak data rate may result in breaching the SLAs of all other users on the same PON.

EP 4 030 708 A1 has disclosed a bandwidth allocation scheme for a network controller, wherein the bandwidth allocated to the participant of the network can be dynamically adjusted according to the available resource as well as the historical behaviour of the participant.

The disclosure of EP 4 030 708 A1 is incorporated here by reference.

In a hierarchical network structure, a physical access node is virtually divided into multiple virtual access nodes, each of them being managed by a Virtual Network Operator hereafter abbreviated by VNO, serving its own subset of subscribers. The physical access node may be actually managed by an Infrastructure provider, hereafter abbreviated by InP. Each virtual access nodes may be referred to as a slice hereafter.

According to EP 4 030 708 A1, the bandwidth allocation is performed separately for respective network controllers. In a slicing context, heavy user in one slice might cause the speed test initiated by users in other slice fail.

There is thus a need for an improved method and apparatus to improve peak data rate availability for all users in the presence of a heavy user.

SUMMARY OF THE INVENTION

According to a first aspect of the invention, there is provided an apparatus comprising means for: obtaining, a first parameter indicating a contention situation of a first network comprising a plurality of virtual network operators, VNOs, as participants; obtaining, a second parameter indicating a historical bandwidth utilization of respective one of the VNOs; determining, based on the first parameter and the second parameter, a first scheduler parameter and/or a first shaper parameter, for being provided to an output of the apparatus, wherein the first scheduler parameter and/or the first shaper parameter is related to allocating bandwidth to one of the VNOs; transmitting, to a controller of said one of the VNOs, the first scheduler parameter and/or the first shaper parameter.

According to a second aspect of the invention, there is provided an apparatus comprising means for: receiving, a first scheduler parameter and/or a first shaper parameter from a controller of a first network comprising a plurality of virtual network operators, VNOs, as participants, wherein the first scheduler parameter and/or the first shaper parameter is related to allocating bandwidth to one of the VNOs; said one of the VNOs comprising a plurality of subscribers; obtaining, a first parameter indicating a contention situation of the first network; obtaining, a third parameter indicating a historical bandwidth utilization of respective subscribers of said one of the VNOs; determining, based on the first scheduler parameter and/or the first shaper parameter, the first parameter and the third parameter, a second scheduler parameter and/or a second shaper parameter for being provided to an output of the apparatus, wherein, the second scheduler parameter and/or the second shaper parameter is related to allocating bandwidth to one of the subscribers of said one of the VNOs.

According to a third aspect of the invention, there is provided a method comprising: obtaining, a first parameter indicating a contention situation of a first network comprising a plurality of virtual network operators, VNOs, as participants; obtaining, a second parameter indicating a historical bandwidth utilization of respective one of the VNOs; determining, based on the first parameter and the second parameter, a first scheduler parameter and/or a first shaper parameter, for being provided to an output of the apparatus, wherein the first scheduler parameter and/or the first shaper parameter is related to allocating bandwidth to one of the VNOs; transmitting, to a controller of said one of the VNOs, the first scheduler parameter and/or the first shaper parameter.

According to a fourth aspect of the invention, there is provided a method comprising: receiving, a first scheduler parameter and/or a first shaper parameter from a controller of a first network comprising a plurality of virtual network operators, VNOs, as participants, wherein the first scheduler parameter and/or the first shaper parameter is related to allocating bandwidth to one of the VNOs; said one of the VNOs comprising a plurality of subscribers; obtaining, a first parameter indicating a contention situation of the first network; obtaining, a third parameter indicating a historical bandwidth utilization of respective subscribers of said one of the VNOs; determining, based on the first scheduler parameter and/or the first shaper parameter, the first parameter and the third parameter, a second scheduler parameter and/or a second shaper parameter for being provided to an output of the apparatus, wherein, the second scheduler parameter and/or the second shaper parameter is related to allocating bandwidth to one of the subscribers of said one of the VNOs.

According to a fifth aspect of the invention, there is provided a computer program comprising instructions for causing an apparatus to perform at least the following: obtaining, a first parameter indicating a contention situation of a first network comprising a plurality of virtual network operators, VNOs, as participants; obtaining, a second parameter indicating a historical bandwidth utilization of respective one of the VNOs; determining, based on the first parameter and the second parameter, a first scheduler parameter and/or a first shaper parameter, for being provided to an output of the apparatus, wherein the first scheduler parameter and/or the first shaper parameter is related to allocating bandwidth to one of the VNOs; transmitting, to a controller of said one of the VNOs, the first scheduler parameter and/or the first shaper parameter.

According to a sixth aspect of the invention, there is provided a computer program comprising instructions for causing an apparatus to perform at least the following: receiving, a first scheduler parameter and/or a first shaper parameter from a controller of a first network comprising a plurality of virtual network operators, VNOs, as participants, wherein the first scheduler parameter and/or the first shaper parameter is related to allocating bandwidth to one of the VNOs; said one of the VNOs comprising a plurality of subscribers; obtaining, a first parameter indicating a contention situation of the first network; obtaining, a third parameter indicating a historical bandwidth utilization of respective subscribers of said one of the VNOs; determining, based on the first scheduler parameter and/or the first shaper parameter, the first parameter and the third parameter, a second scheduler parameter and/or a second shaper parameter for being provided to an output of the apparatus, wherein, the second scheduler parameter and/or the second shaper parameter is related to allocating bandwidth to one of the subscribers of said one of the VNOs.

According to a seventh aspect of the invention, there is provided an apparatus comprising at least one processor and at least one memory including computer program code, the at least one memory and the computer program code configured to with the at least one processor, cause the apparatus at least to perform: obtaining, a first parameter indicating a contention situation of a first network comprising a plurality of virtual network operators, VNOs, as participants; obtaining, a second parameter indicating a historical bandwidth utilization of respective one of the VNOs; determining, based on the first parameter and the second parameter, a first scheduler parameter and/or a first shaper parameter, for being provided to an output of the apparatus, wherein the first scheduler parameter and/or the first shaper parameter is related to allocating bandwidth to one of the VNOs; transmitting, to a controller of said one of the VNOs, the first scheduler parameter and/or the first shaper parameter.

According to an eighth aspect of the invention, there is provided an apparatus comprising at least one processor and at least one memory including computer program code, the at least one memory and the computer program code configured to with the at least one processor, cause the apparatus at least to perform: receiving, a first scheduler parameter and/or a first shaper parameter from a controller of a first network comprising a plurality of virtual network operators, VNOs, as participants, wherein the first scheduler parameter and/or the first shaper parameter is related to allocating bandwidth to one of the VNOs; said one of the VNOs comprising a plurality of subscribers; obtaining, a first parameter indicating a contention situation of the first network; obtaining, a third parameter indicating a historical bandwidth utilization of respective subscribers of said one of the VNOs; determining, based on the first scheduler parameter and/or the first shaper parameter, the first parameter and the third parameter, a second scheduler parameter and/or a second shaper parameter for being provided to an output of the apparatus, wherein, the second scheduler parameter and/or the second shaper parameter is related to allocating bandwidth to one of the subscribers of said one of the VNOs.

According to a ninth aspect of the invention, there is provided a non-transitory computer readable medium comprising program instructions for causing an apparatus to perform at least the following: obtaining, a first parameter indicating a contention situation of a first network comprising a plurality of virtual network operators, VNOs, as participants; obtaining, a second parameter indicating a historical bandwidth utilization of respective one of the VNOs; determining, based on the first parameter and the second parameter, a first scheduler parameter and/or a first shaper parameter, for being provided to an output of the apparatus, wherein the first scheduler parameter and/or the first shaper parameter is related to allocating bandwidth to one of the VNOs; transmitting, to a controller of said one of the VNOs, the first scheduler parameter and/or the first shaper parameter.

According to a tenth aspect of the invention, there is provided a non-transitory computer readable medium comprising program instructions for causing an apparatus to perform at least the following: receiving, a first scheduler parameter and/or a first shaper parameter from a controller of a first network comprising a plurality of virtual network operators, VNOs, as participants, wherein the first scheduler parameter and/or the first shaper parameter is related to allocating bandwidth to one of the VNOs; said one of the VNOs comprising a plurality of subscribers; obtaining, a first parameter indicating a contention situation of the first network; obtaining, a third parameter indicating a historical bandwidth utilization of respective subscribers of said one of the VNOs; determining, based on the first scheduler parameter and/or the first shaper parameter, the first parameter and the third parameter, a second scheduler parameter and/or a second shaper parameter for being provided to an output of the apparatus, wherein, the second scheduler parameter and/or the second shaper parameter is related to allocating bandwidth to one of the subscribers of said one of the VNOs.

According to an eleventh aspect of the invention, there is provided a computer readable medium comprising program instructions for causing an apparatus to perform at least the following: obtaining, a first parameter indicating a contention situation of a first network comprising a plurality of virtual network operators, VNOs, as participants; obtaining, a second parameter indicating a historical bandwidth utilization of respective one of the VNOs; determining, based on the first parameter and the second parameter, a first scheduler parameter and/or a first shaper parameter, for being provided to an output of the apparatus, wherein the first scheduler parameter and/or the first shaper parameter is related to allocating bandwidth to one of the VNOs; transmitting, to a controller of said one of the VNOs, the first scheduler parameter and/or the first shaper parameter.

According to a twelfth aspect of the invention, there is provided a computer readable medium comprising program instructions for causing an apparatus to perform at least the following: receiving, a first scheduler parameter and/or a first shaper parameter from a controller of a first network comprising a plurality of virtual network operators, VNOs, as participants, wherein the first scheduler parameter and/or the first shaper parameter is related to allocating bandwidth to one of the VNOs; said one of the VNOs comprising a plurality of subscribers; obtaining, a first parameter indicating a contention situation of the first network; obtaining, a third parameter indicating a historical bandwidth utilization of respective subscribers of said one of the VNOs; determining, based on the first scheduler parameter and/or the first shaper parameter, the first parameter and the third parameter, a second scheduler parameter and/or a second shaper parameter for being provided to an output of the apparatus, wherein, the second scheduler parameter and/or the second shaper parameter is related to allocating bandwidth to one of the subscribers of said one of the VNOs.

According to the example embodiments, the bandwidth allocated to the participant of the network can be dynamically adjusted according slice weight and/or slice shaper parameter, as well as based on the available resource and the historical behaviour of the participant. Knowing the slice weight, the VNO controller may be able to compute the minimal subscriber weight (or maximum weight reduction) it can apply to any subscriber while still guaranteeing their respective assured rate. Thus, peak data rate availability for all users in the presence of a heavy user is improved. The speed test success probability for all subscribers is enhanced while the impact on the heavy user is limited. More concretely, any subscriber should be able to run a successful speed test in the presence of a heavy user.

BRIEF DESCRIPTION OF THE FIGURES

For a more complete understanding of example embodiments of the present invention, reference is now made to the following descriptions taken in connection with the accompanying drawings in which.

Same or similar reference numerals refer to same or similar parts or components.

DETAILED DESCRIPTION

Example embodiments of the present application are described herein in detail and shown by way of example in the drawings. It should be understood that, although specific embodiments are discussed herein there is no intent to limit the scope of the invention to such embodiments. To the contrary, it should be understood that the embodiments discussed herein are for illustrative purposes, and that modified and alternative embodiments may be implemented without departing from the scope of the invention as defined in the claims. The sequence of method steps is not limited to the specific embodiments, the method steps may be performed in other possible sequence. Similarly, specific structural and functional details disclosed herein are merely representative for purposes of describing the embodiments. The invention described herein, however, may be embodied in many alternate forms and should not be construed as limited to only the embodiments set forth herein.

Figure 1:
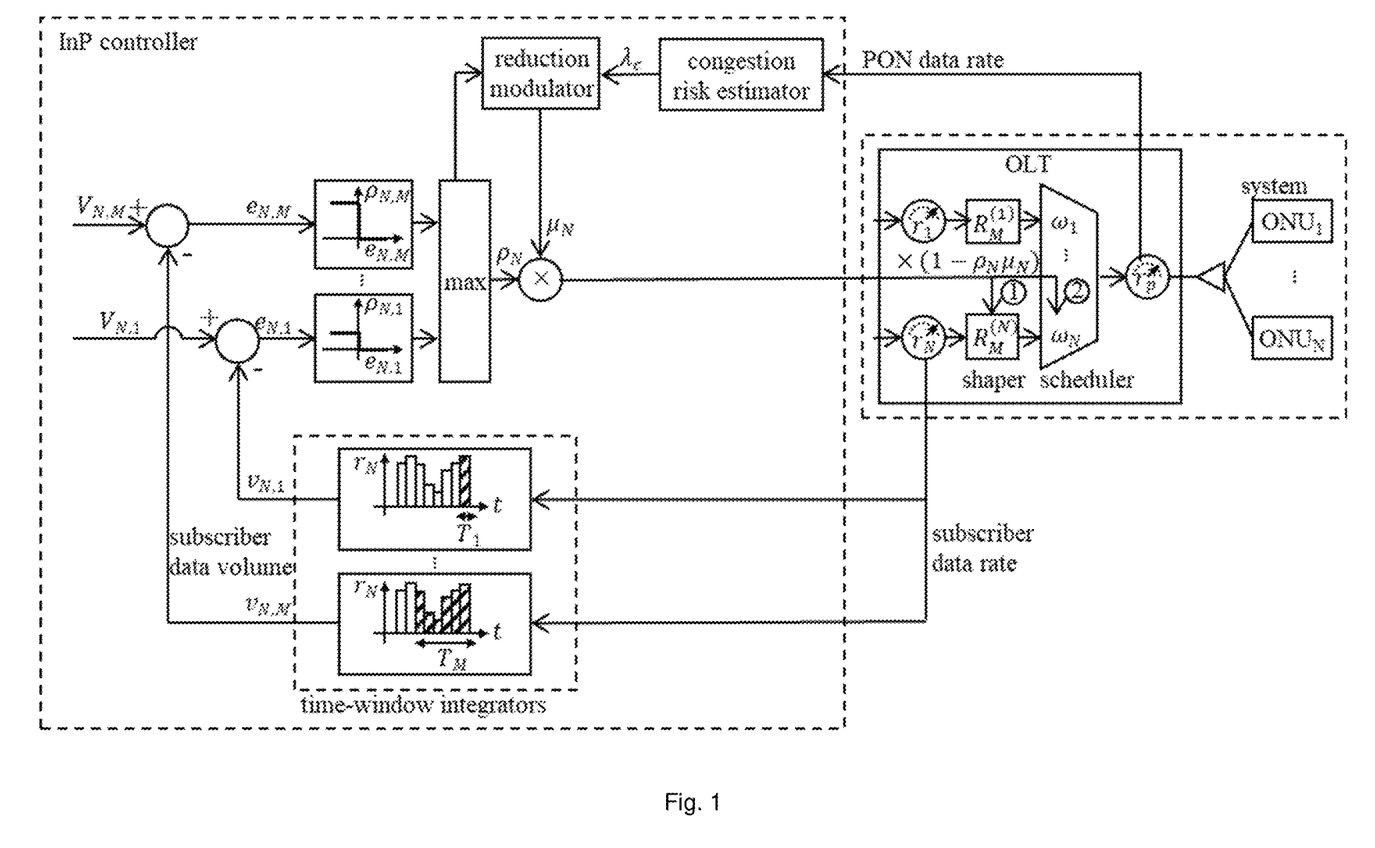
FIG. 1 shows a schematic block diagram of an example traffic controller in an unsliced PON.

FIG. 1 shows a schematic block diagram of an example traffic controller in an unsliced PON.

EP 4 030 708 A1 discloses such a traffic controller which adjusts the shaper parameter and/or the scheduler parameter for respective subscriber based on indication of contention and historical bandwidth utilization of respective subscriber.

Specifically, in the example shown in FIG. 1, every subscriber may be managed independently with such a traffic controller. FIG. 1 illustrates the control system for subscriber s=N, who is connected to ONU N. The controller uses shaper adaptation in the figure indicated by (1) and/or scheduler adaptation indicated by (2).

The system under control is a PON that consists of an OLT connected through fiber to N ONUs. In this example, it is assumed that each ONU connects a single subscriber to the PON. Thus, there are N PON subscribers. A skilled person shall understand, in other embodiments, each ONU may be connected to a plurality of subscribers. The OLT manages the downstream traffic for every subscriber s with s=1,2, ..., N as follows. First, the data rate of the traffic generated by a subscriber s is limited by a shaper to a maximum data rate $R_M^{(s)}$. Secondly, the traffic of subscriber s is scheduled using Weighted Fair Queue scheduler (WFQ) according to a weight $\omega_s$. Note that the standard notation $R_M$ and $\omega$ may be used for the maximum bandwidth and the weight for the best effort bandwidth assignment, respectively, with an additional index s, which indicates the subscriber to which these traffic descriptor components refer.

Specifically, as shown in FIG. 1, the OLT measures the data rate $r_s$ for every subscriber s and the PON data rate $r_p$. These data rates are measured at regular intervals. The interval between two consecutive measurements is the control interval $T_c$. Every measured data rate is the average of the instantaneous data rate over the control interval. The data rate of subscriber s measured at time $t_n = nT_c$ with n=0,1, 2, ... is noted $r_s[n]$. In FIG. 1, the time index n is not added for simplicity.

For every subscriber s, the controlled system variable is the data rate $r_s[n]$. The control system relies on M negative feedback signals that close the control loop all derived from the data rate $r_s[n]$. Each signal is based on a different time window $T_w = H_w T_c$ with w=1,2, ..., M and $H_w \in \mathbb{N}^+$. At time $t_n$, such a signal consists of the data volume consumed by subscriber s during a time window $T_w$ that runs from $t_n - T_w$ to the current time $t_n$. This data volume is determined by a time-window integrator as $v_{s,w}[n] = \Sigma_{l=n-H_w+1}^{n} r_s[l] T_c$. By taking the history of the subscriber data rate into account, the controller can ensure fairness between subscribers over the longer term. Each feedback signal $v_{s,w}[n]$ is compared with a constant reference data volume signal $V_{s,w}$ and the difference is an error signal $e_{s,w}[n]$ used as an input for further processing. For every time window w, the controller converts the error signal $e_{s,w}[n]$ into a relative reduction $\rho_{s,w}[n] = \rho_{s,w}(e_{s,w}[n])$ using the non-linear function below with $P_{s,w} \in ]0,1[$.

$$\rho_{s,w}(e) = \begin{cases} P_{s,w} & \text{if } e < 0 \\ 0 & \text{if } e \geq 0 \end{cases}$$

The function $\rho_{s,w}$ boils down to the following rule. If the data volume $v_{s,w}[n]$ consumed during the time window $T_w$ exceeds the reference data volume $V_{s,w}$, then a relative reduction $P_{s,w}$ is applicable. The controller output consists of the maximum relative reduction over all windows, i.e., $\rho_s[n] = \max_w \rho_{s,w}[n]$ multiplied with a reduction modulation factor $\mu_s[n]$, which will be explained later below. The conversion of controller inputs to output is clearly non-linear. The modulated relative reduction is applied by multiplying a factor $1 - \rho_s[n]\mu_s[n]$ to either ○;1 the shaper rate $R_M^{(s)}$ or ○;2 the scheduler weight $\omega_s$. This adaptation is done by the controller at every time $t_n$.

Shaper Adaptation

When a subscriber consumes too much data, shaper adaptation reduces the subscriber's actual data rate. Because of the impact on the subscriber's service experience, a rate reduction may be only applied when the PON risks to be congested. Therefore, the control system includes an additional feedback loop based on the measurement of the PON data rate. However, this loop may cause oscillations. When the controller adapts the shaper, the congestion risk drops. This drop may cause the controller to lift the shaper rate reduction. As a result, the congestion risk may rise again. Therefore, the control system includes a reduction modulator designed to lift a shaper rate reduction when the congestion risk has dropped while avoiding oscillations.

The congestion risk estimator converts the measured PON data rate $r_p[n]$ into a congestion risk level $\lambda_c[n]$, which is high (1), low (0), or very low (−1). Depending on that risk level $\lambda_c[n]$ and the reductions $\rho_s[n-1]$ applied at $t_{n-1}$ with $s=1,2,\ldots,N$, the reduction modulator determines $\mu_s[n]$ as given by:

$$\mu_s[n] = \begin{cases} 1 & \text{if } \lambda_c[n] = 1 \\ 1 & \text{if } \lambda_c[n] = 0 \text{ and } \exists s: \rho_s[n-1] \neq 0 \\ 0 & \text{if } \lambda_c[n] = 0 \text{ and } \forall s: \rho_s[n-1] = 0 \\ f(l[n]) & \text{if } \lambda_c[n] = -1 \end{cases}$$

If the congestion risk level is very low, then $\mu_s[n]$ is a function of the number $l[n]$ of consecutive very-low-risk intervals as defined in:

$$f(l) = \begin{cases} 1 - \left(\dfrac{l}{l_0}\right)^\alpha & \text{if } l \leq l_0 \\ 0 & \text{if } l > l_0 \end{cases}$$

The exponent $\alpha$ is equal to $\ln(\tfrac{1}{2})/\ln(l_{1/2}/l_0)$ with $l_0$ the number of intervals required to reduce $\mu_s[n]$ to 0 and $l_{1/2}$ the number of intervals required to reduce $\mu_s[n]$ to ½. $l_0$ and $l_{1/2}$ can be set to, for example, 5 and 3 respectively.

In this way the reduction modulator implements hysteresis. When the shaper rate of none of the subscribers is reduced, the controller does not apply any shaper adaption if the congestion risk level is low. However, once the shaper rate of at least one subscriber is reduced, a required reduction is always applied unless the congestion risk is very low. In addition, when the congestion risk is very low and a shaper is reduced, this reduction is only gradually lifted. The function $f(l)$ decreases initially slowly as a function of l. If the congestion risk remains very low, then after a while, the function decreases more rapidly.

Scheduler Adaptation

When a subscriber consumes too much data, scheduler adaptation does not reduce the subscriber's data rate unless there is actual PON contention, a network state in which packets are queued by the scheduler. Therefore, the risk of oscillations is much lower. Thus, the feedback loop added for shaper adaptation is not strictly required, but may still be useful to avoid loading the system unnecessarily. The design of the congestion risk estimator and reduction modulator can be simplified. Because hysteresis is not required, the very low risk level can be dropped. The reduction modulator determines $\mu_s[n]$ as given by:

$$\mu_s[n] = \begin{cases} 1 & \text{if } \lambda_c[n] = 1 \text{ or } \rho_s[n-1] \neq 0 \\ 0 & \text{otherwise} \end{cases}$$

Thus, once a subscriber's weight is reduced, the controller keeps applying the required weight reduction even when the congestion risk has dropped. This approach avoids system load due to unnecessary weight reconfigurations when the congestion risk changes frequently.

Rule Configuration

It is explained below how to configure the rules embedded in the traffic controller to improve fairness between subscribers over the longer term. The rules are subscriber-specific. However, in this section, for simplicity, the subscriber index s is dropped. A rule consists of a relative reduction $P_w$ to be applied to either the shaper rate $R_M$ or scheduler weight $\omega$ of a subscriber who downloads more than a data volume $V_w$ during a time window $T_w$. Such a data volume threshold $V_w$ is equivalent to a window-average data rate threshold $R_W^{(w)} = V_w/T_w$. A rule can be summarized as the triple $(R_W^{(w)}, T_w, P_w)$.

The extension of the static traffic management based on shapers and WFQ scheduler with the proposed closed-loop traffic controller enables an extension of the common traffic descriptor with the rules used by the controller. For a beneficial extension, the rules need to be consistent with the original traffic descriptor. The downstream traffic descriptor D for a subscriber is commonly defined as $D = \langle R_A, R_M, \omega \rangle$ with $R_A$ the assured bandwidth, $R_M$ the maximum bandwidth, and $\omega$ the weight for the best effort bandwidth assignment. $R_A$ is also called the committed information rate (CIR) and $R_M$ the peak information rate (PIR). Under the assumption that the weights are normalized, the weight $\omega$ provides a subscriber a minimum information rate upon contention (MIRC) $R_C = \omega C$ with C the PON net downstream capacity. To ensure that $R_C \geq R_A$, it is required that $\omega \geq R_A/C$. To optimize the bandwidth sharing, the traffic descriptor may be extended to $D' = \langle R_A, R_M, \omega, \{(R_W^{(w)}, T_w, P_w) | w = 1,2,\ldots,M\} \rangle$.

For a short time period, say a fraction $\phi \in ]0,1]$ of the control interval $T_c$, a subscriber should be allowed to transmit at the maximum bandwidth $R_M$ without any constraints. Therefore, for w=1, it is configured $T_1 = T_c$ and $R_W^{(1)} = \phi R_M$. For a control interval of 5 min, $\phi$ is set to, for example, 80%. Over a long time period, the average data rate of a subscriber should be limited to their sustainable share $\omega$ of the capacity C. Therefore, for w=M, it is configured $R_M = \omega C$. The window width $T_M$ can be set to, for example, 1 month. To decrease the required controller memory size, $T_M$ can be reduced to 24 h in the case of scheduler adaptation because this method causes less service impact. For intermediate time periods $T_w$ with w=2,3,..., M−1, $R_W^{(w)}$ may be derived by linear interpolation between $(T_1, R_W^{(1)})$ and $(T_M, R_W^{(M)})$ using a logarithmic scale for both $T_w$ as well as $R_W^{(w)}$. The time windows $T_w$ are equidistantly spaced on a logarithmic scale.

For shaper adaptation, the relative reduction $P_w$ of the shaper rate $R_M$ is determined as $P_w = 1 - (R_M - R_W^{(w)})/R_M + \epsilon$. In this way, the subscriber's data rate is limited by the shaper to $R_W^{(w)} + \epsilon R_M$. Without the margin provided by $\epsilon$, after a while, the subscriber's data rate would no longer exceed the average data rate threshold $R_W^{(w)}$ and thus the associated reduction $P_w$ would be lifted even if the heavy user is still active. Thus, the margin $\epsilon$, which is set to, for example, 3% prevents oscillations.

For scheduler adaptation, the relative reduction $P_w$ of the scheduler weight $\omega$ is determined as follows. Because a weight reduction only affects the subscriber's data rate upon PON contention, a subscriber's weight can be reduced to the minimum value $\omega^{min}=R_A/C$. The longer a subscriber hogs the bandwidth, the more their weight should be reduced. Therefore, we set $P_M=1-\omega^{min}/\omega$ and $P_w=P_M-(M-w)\Delta P$ with $\Delta P=(P_M-P^{min})/(M-1)$. The reduction $P^{min}$ set to, for example, 50% represents the desired minimum relative reduction.

Congestion Risk Estimator

The purpose of the congestion risk estimator shown in FIG. 1 depends on the traffic management element adapted by the controller as explained above. For shaper adaptation, the congestion risk estimator reduces the impact of the controller on the service provided to a heavy user. For scheduler adaptation, this estimator avoids loading the system with unnecessary weight reconfigurations. In the following, it will be explained how the PON congestion risk is estimated.

A speed test is defined to be successful if the ratio of the measured data rate to the PIR exceeds a threshold, for example, 80%. A PON is defined to be congested if the speed test success probability fails to reach a threshold, for example, 80%. Such a congestion definition corresponds to the, so called, 80/80 standard used by the FCC, which requires 80% of download measurements to be at or above 80% of the advertised download speed. In this way, congestion is defined as perceived by a subscriber when running a speed test.

In this section, C represents the PON congestion state. The state C=1 corresponds to a congested PON while C=0 means the PON is not congested. The congestion state can be determined directly by running speed tests from the ONU or from a dedicated test head. Such a method is accurate, but not scalable because the traffic generated by the speed tests load the network. Alternatively, the congestion state can be derived from the OLT measurement of the average PON data rate by means of a heuristic. In this case, a PON is deemed congested if the average free PON capacity fails to reach a certain threshold. Such a heuristic is scalable, but not accurate because the instantaneous PON data rate fluctuates rapidly due to the burstiness of residential Internet traffic and a speed test runs in a time period under 30 s while the OLT can typically measure the average PON data rate only once every 5 min. Therefore, it is proposed to replace the heuristic by a machine-learning (ML) model that uses the OLT measurement of the average PON data rate $r_p$ to predict the risk $\pi_c$ that the PON is congested (C=1), i.e., $\pi_c=P(C=1|R_p=r_p)$. The average PON data rate $R_p$ over the control interval $T_C=5$ min is the (single) predictor and the congestion state C is the response.

To model the congestion risk $\pi_c=P(C=1|R_p=r_p)$ a Gaussian Bayes classifier as given below is used:

$$\pi_c = P(C=1|R_p=r_p) =$$

$$\frac{P(R_p=r_p|C=1)P(C=1)}{P(R_p=r_p)} = \frac{f_1(r_p|\mu_1,\sigma_1^2)\frac{n_1}{n}}{f_0(r_p|\mu_0,\sigma_0^2)\frac{n_0}{n}+f_1(r_p|\mu_1,\sigma_1^2)\frac{n_1}{n}}$$

In the equation above, $f_j(r_p|\mu_j,\sigma_j^2)$ represents the Gaussian distribution of the average PON data rate $R_p$ given C=j. The mean $\mu_j$ and the standard deviation $\sigma_j$ can be estimated using observations from a training dataset that is obtained either from field data or from simulation. In addition, $n_j$ represents the number of observations with $c_i=j$ and n is the total number of observations in the training dataset.

The ML model provides the congestion risk $\pi_c$. However, as explained in above, the reduction modulator expects a congestion risk level $\lambda_c$ as input. For scheduler adaptation, this risk level $\lambda_c$ is determined by comparing the congestion risk $\pi_c$ with a predetermined threshold $\pi_t$: if $\pi_c>\pi_t$, then $\lambda_c=1$ (high risk), else $\lambda_c=0$ (low risk). For shaper adaptation, two thresholds $\pi_l$ and $\pi_h$ are required with $\pi_l<\pi_h$: if $\pi_c>\pi_h$, then $\lambda_c=1$ (high risk), if $\pi_c<\pi_l$, then $\lambda_c=-1$ (very low risk), else $\lambda_c=0$ (low risk).

Figure 2:
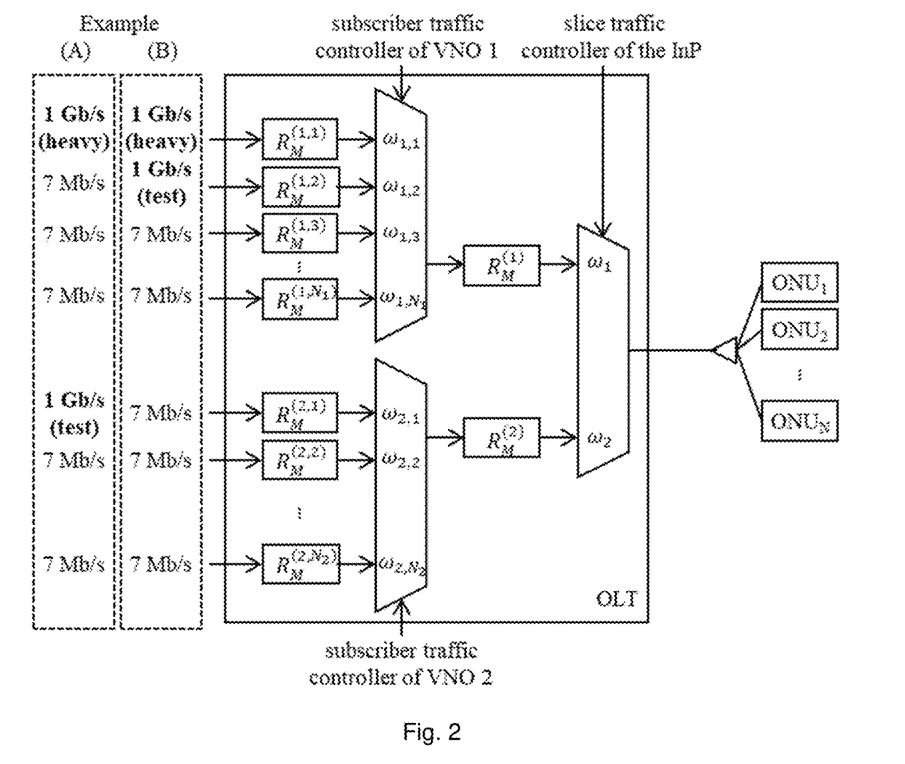
FIG. 2 shows a schematic block diagram of a sliced PON according to state of the art.

FIG. 2 shows a schematic block diagram of a sliced PON according to state of the art.

As shown in FIG. 2, the InP provides two slices, each of them being managed by a VNO, VNO1 and VNO2. Each VNO manages the traffic for a plurality of subscribers. A skilled person shall understand, there may be more than two slices, for example, there may be L slices. The number of subscribers in each slice may be more or less than those shown in FIG. 2.

The first level of the hierarchy uses InP controller to schedule the slice traffic and the second level uses the VNO controllers (there is one VNO controller per VNO) to schedule the subscriber traffic. The InP configures for every slice $\sigma=1, 2, \ldots, L$ the slice weight $\omega_\sigma$ and shaper rate $R_M^{(\sigma)}$ according to the SLAs between the InP and its VNO customers. Note that in the context of a sliced PON, a single index refers to a slice. Every VNO $\sigma=1, 2, \ldots, L$ configures for every subscriber $s=1, 2, \ldots, N_\sigma$ in slice $\sigma$ the subscriber weight $\omega_{\sigma,s}$ and shaper rate $R_M^{(\sigma,s)}$ according to the SLAs between VNO $\sigma$ and its subscribers. The total number of subscribers is $N=\Sigma_{\sigma=1}^{L}N_\sigma$.

The problem of speed test failure in the slicing context in the presence of a heave user is illustrated below using the example show in FIG. 2.

Assuming there are N=128 active subscribers equally divided between slice 1 and 2, i.e., $N_1=N_2=64$. For every slice $\sigma$, every subscriber s is provisioned with $R_M^{(\sigma,s)}=1$ Gb/s and $\omega_{\sigma,s}=1$. All slices $\sigma$ are provisioned with $R_M^{(\sigma)}=C$ and $\omega_\sigma=1$. Note that the weights are not normalized. With the net downstream GPON capacity C=2.3 Gb/s, a subscriber s in slice $\sigma$ has an MIRC of $R_C^{(\sigma,s)}=(\omega_{\sigma,s}/\Sigma_{t=1}^{N_\sigma}\omega_{\sigma,t})(\omega_\sigma/\Sigma_{\tau=1}^{L}\omega_\tau)C=18$ Mb/s. For both slices, the slice utilization is assumed to be $U_\sigma=r_\sigma/C=40\%$ where $r_\sigma$ represents the data rate of the traffic of slice $\sigma$. Suppose that every normal (nrm) user s in every slice $\sigma$ contributes to the traffic according to its weight, i.e., $r_{\sigma,s}^{nrm}=U_\sigma R_C^{(\sigma,s)}=7$ Mb/s. However, there are two users who want to download at a higher data rate. Subscriber 1 in slice 1 is a heavy user who wants to download data at the PIR $R_M^{(1,1)}=1$ Gb/s during a long time period. Subscriber 1 in slice 2 (column A in FIG. 2) or subscriber 2 in slice 1 (column B in FIG. 2) run a speed test to verify their PIR, i.e., $R_M^{(2,1)}=1$ Gb/s, resp., $R_M^{(1,2)}=1$ Gb/s.

If subscriber 1 in slice 2 runs a speed test, then for each slice $\sigma$, the normal users generate traffic with a total data rate of $r_\sigma^{nrm}=(N_\sigma-1)r_{\sigma,s}^{nrm}=453$ Mb/s. There is contention between the heavy user 1 in slice 1 and the speed test user 1 in slice 2. This contention limits the data rate of user 1 in slice 1 to $\omega_1 C/(\omega_1+\omega_2)-r_1^{nrm}=697$ Mb/s. Similarly, the data rate of user 1 in slice 2 is limited to 697 Mb/s as well. Thus, the speed test fails.

Figure 3:
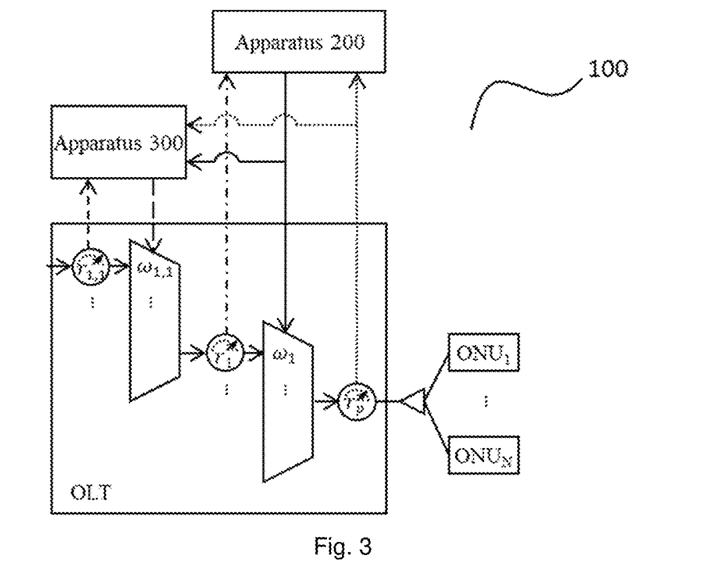
FIG. 3 shows a schematic block diagram of an exemplifying communication network in which examples of disclosed embodiments may be applied.

FIG. 3 shows a schematic block diagram of an exemplifying communication network in which examples of disclosed embodiments may be applied.

For simplicity, the similar functions as described above with respect to FIGS. 1 and 2 will not be repeated here.

Furthermore, the shapers are not shown in the example of FIG. 3. In the following, various embodiments will be elaborated with respect to the weight scheduling. A skilled person shall understand, other embodiments may alternatively or additionally comprise shapers.

In the example shown in FIG. 3, the communication network 100 is an optical network. Alternatively, various embodiments may also be implemented in a cable network, e.g. a coaxial network, or also a mobile network, or any combination of both fixed and wireless network. Generally, the communication network 100 may be any shared medium communication network.

The apparatus 200 according to various embodiments is configured to obtain, a first parameter indicating a contention situation of a first network comprising a plurality of VNOs as participants, as indicated by the dotted line in FIG. 3.

In one embodiment, the first network may be managed by an InP controller. Although only one slice is shown in FIG. 3, a skilled person shall understand, the InP controller may provide a plurality of slices, each managed by a VNO. In the example shown in FIG. 3, the apparatus 200 implementing various embodiments may be implemented directly in the InP controller controlling the traffic of each slice. Alternatively, the apparatus 200 may be implemented for example as software, firmware or hardware communicatively connected to the InP controller.

Alternatively, the first network may be a virtual network and managed by a VNO controller. In the example with more than two levels hierarchies, the InP may provide slicing for a first level VNOs, the first level VNOs may provide slicing for a second level VNOs, the second level VNOs may respectively manage a plurality of subscribers. In that case, the first network may be managed by a first level VNO controller. The apparatus 200 implementing various embodiments may be implemented directly in the first level VNO controller controlling the traffic of each second level VNO. Alternatively, the apparatus 200 may be implemented for example as software, firmware or hardware communicatively connected to the first level VNO controller.

For simplicity, in the following various embodiments will be elaborated in a two-levels hierarchy.

A skilled person should know various ways of determining the first parameter indicating a contention situation. Specifically, the first parameter may be determined based on monitoring of the data rate of the first network, for example the PON data rate. In one example, the first parameter may be determined by the InP controller, and subsequently provided to the apparatus 200, for example when the apparatus 200 is implemented as software communicatively connected to the InP controller. In another example, the first parameter may be determined by the apparatus 200, for example when the apparatus 200 is directly implemented in the InP controller. In yet another example, the first parameter may also be determined by the OLT, or generally by the access node. In this case, only the aggregated contention level is streamed to the InP controller or to the apparatus 200.

Specifically, in one example implementation, the apparatus may comprise means which are further configured to obtain the first parameter as indicating a ratio of time, during which the bandwidth utilized by the participants of the first network causes a contention.

More specifically, in one example, based on the actual total Bandwidth utilization of all the active network participants in the first network during a predetermined time period, for example 5 minutes, the first parameter may be determined as a ratio of aggregated time interval(s) to the predetermined time period, during the time interval(s) the bandwidth utilized by the plurality of network participants is above a predetermined threshold, for example 95% of the total available Bandwidth.

The first parameter is used to monitor how close is the actual Bandwidth utilization to the total link capacity (or how close is the link to contention). In other words, the first parameter is used to monitor the remaining available bandwidth that the WFQ scheduler can still distribute to any participant of the network creating an extra demand (for example doing a speed test). Due to the rapidly varying traffic demand induced by web surfing, online gaming or other variable Bandwidth type of application, it is advantageous to monitor this remaining capacity over short periods of time, typically in the order of magnitude of user perception (in seconds). Depending on the desired loop reaction time, the contention may be expressed as a ratio of a larger time period (e.g. contention of 1% during the last 5 minutes).

Furthermore, in another example implementation, the apparatus 200 may comprise means which are further configured to obtain the first parameter as a predicted congestion level. Specifically, the predicted congestion level may be determined based on monitoring of the data rate of the first network, and based on various prediction methods, for example the method elaborated above with respect to FIG. 1.

The apparatus 200 is further configured to obtain, a second parameter indicating a historical bandwidth utilization of respective one of the VNOs, as indicated by the dash dotted line in FIG. 3.

A skilled person should know various ways of determining the second parameter. For example, similar as the first parameter, the second parameter may be determined by the InP controller or by the access node, based on monitoring of the data rate of each slice. The InP controller or the access node may subsequently provide the second parameter to the apparatus 200.

Specifically, in one example implementation, the apparatus 200 may comprise means which are further configured to obtain the second parameter as indicating historical bandwidth consumption of respective ones of the participants of the first network over at least one time window, advantageously over a plurality of time windows. For example, time window integrators described above with respect to FIG. 1 may be used by the InP controller or the access network node to determine, for every participant of the first network, the actual Bandwidth utilization over the last 5 minutes, last 15 minutes, last 1 h, last 4 h, last day, last week, last month, etc.

The apparatus 200 is further configured to determine, based on the first parameter and the second parameter, a first scheduler parameter and/or a first shaper parameter, for being provided to an output of the apparatus 200, wherein the first scheduler parameter and/or the first shaper parameter is related to allocating bandwidth to one of the VNOs.

Specifically, the first scheduler parameter may indicate a weight or a weight reduction amount corresponding to respective VNO in the first network for use in a Weighted Fair Queue scheduler, and the first shaper parameter indicates a limit or a limit reduction amount of the bandwidth allocated to respective VNO in the first network.

More specifically, for example, the weights may be represented either as floating numbers between 0 and 1, or by integers ranging from 0 to a maximum value that depends on the quantification (e.g. 255 for 8 bits quantification). The weight reduction may indicate a relative reduction amount or an absolute reduction that the WFQ may apply to the previous weight value for the respective VNO.

Specifically, applying a relative reduction on the weight can be done using the following formula:

New weight=Original weight*(1−relative reduction)

Alternatively, a weight can also be decreased by an absolute reduction. In this case, the formula to apply would become:

New weight=Original weight−absolute reduction

The shaper limits may be expressed directly as data throughputs (bps, kbps, Mbps, Gbps, etc). The limit reduction amount may indicate a relative reduction amount or an absolute reduction amount that the shaper may apply to the previous shaper limit for the respective VNO.

Specifically, applying a relative reduction on the shaper limit can be done using the following formula:

New shaper limit=Original shaper limit*(1−relative reduction)

Alternatively, a shaper limit can also be decreased by an absolute reduction. In this case, the formula to apply would become:

New shaper limit=Original shaper limit−absolute reduction

The apparatus 200 is further configured to transmit, to a controller of said one of the VNOs, the first scheduler parameter and/or the first shaper parameter.

Specifically, each VNO in the first network may comprise a plurality of subscribers. The controller of respective VNOs is responsible for allocating bandwidth to subscribers of the respective VNO. The controller of said one of the VNOs schedules the traffic for its own subscribers. According to various embodiment, the controller of the VNO may have knowledge of the first scheduler parameter and/or the first shaper parameter that the InP controller has determined for it, and may schedule the traffic for its own subscribers based on the first scheduler parameter and/or the first shaper parameter.

More specifically, In the embodiment shown in FIG. 3, the apparatus 200 may determine the weight for each slice and provide it to the output of the apparatus 200. As indicated by the solid lines in FIG. 3, the weight may be provided from the apparatus 200 to the Weighted Fair Queue scheduler scheduling the slice traffic, and transmitted to the apparatus 300 implementing various embodiments. In the example of FIG. 3 the apparatus 300 may be implemented directly in the controller of the respective VNO, which schedules the traffic for respective subscribers of the VNO. Alternatively, the apparatus 300 may also be implemented for example as software, firmware or hardware communicatively connected to the respective VNO controller.

The apparatus 300 according to various embodiments is configured to receive, a first scheduler parameter and/or a first shaper parameter from a controller of a first network comprising a plurality of virtual network operators, VNOs, as participants, wherein the first scheduler parameter and/or the first shaper parameter is related to allocating bandwidth to one of the VNOs; said one of the VNOs comprising a plurality of subscribers.

In an example, the apparatus 200 may be implemented as software, firmware or hardware respectively communicatively connected to the controller of the first network and the apparatus 300 may be implemented as software, firmware or hardware respectively communicatively connected to the VNO controller. In this case, the first parameter may be transmitted from the apparatus 200 through the controller of the first network and the VNO controller to the apparatus 300.

The apparatus 300 is further configured to obtain, a first parameter indicating a contention situation of the first network, as indicated by the dotted line in FIG. 3.

Similar as described above, the first parameter may be determined by the InP controller or by the access node. Accordingly, the apparatus 300 may obtain the first parameter from the InP controller or the access node. Alternatively, the first parameter may be determined by the VNO controller itself, for example, based on monitoring of the PON data rate.

The apparatus 300 is further configured to obtain, a third parameter indicating a historical bandwidth utilization of respective subscribers of said one of the VNOs, as indicated by the dashed line in FIG. 3.

Similar as the second parameter described above, the third parameter may be determined in various ways. For example, the third parameter may be determined by the VNO controller or by the access node, based on monitoring of the data rate of each subscriber. The VNO controller or the access node may subsequently provide the third parameter to the apparatus 300.

Similarly, the apparatus 300 may be further configured to obtain the third parameter over different time windows.

Similar as the second parameter, time window integrators described above with respect to FIG. 1 may be used by the VNO controller or the access node to aggregate the data volume used by respective subscriber during respective time window.

The apparatus 300 is further configured to determine, based on the first scheduler parameter and/or the first shaper parameter, the first parameter and the third parameter, a second scheduler parameter and/or a second shaper parameter for being provided to an output of the apparatus, wherein, the second scheduler parameter and/or the second shaper parameter is related to allocating bandwidth to one of the subscribers of said one of the VNOs.

Specifically, in some embodiments, the second scheduler parameter indicates a weight or a weight reduction amount corresponding to respective subscriber in said one of the VNOs for use in a Weighted Fair Queue scheduler, and the second shaper parameter indicates a limit or a limit reduction amount of the bandwidth allocated to respective subscriber in said one of the VNOs.

The detailed description above with respect to the first scheduler parameter and/or the first shaper parameter applies also to the second scheduler parameter and the second shaper parameter. The weight reduction may indicate a relative reduction amount or an absolute reduction that the WFQ may apply to the previous weight value for the respective subscriber. Similarly, the second shaper parameter may indicate a relative limit reduction amount or an absolute limit reduction amount that the shaper may apply to the previous shaper limit for the respective subscriber of the VNO.

As shown in FIG. 3, the apparatus 300 may determine the weight for each subscriber and provide it to the output of the apparatus 300. As indicated by the long-dashed line in FIG. 3, the weight may be provided from the apparatus 300 to the Weighted Fair Queue scheduler scheduling the subscriber traffic.

The detailed description above with respect to the first scheduler parameter and the first shaper parameter also applies to the second scheduler parameter and the second shaper parameter. For simplicity, it will not be repeated here.

Thereby, every time the weight of the VNO's slice is adjusted by the slice traffic controller of the InP, the VNO's subscriber traffic controller may reconfigure the subscriber weight according to the slice weight. Generally, the VNO controller determines scheduler parameter and/or shaper parameter for its respective subscriber, so as to guarantee their respective assured rate. Adjusting the second scheduler parameter of respective subscriber based on the first scheduler parameter and/or the first shaper parameter improves the peak data rate availability for all users in the presence of a heavy user. Additionally or alternatively, same effect may be obtained by adjusting the second shaper parameter for respective subscriber based on the first scheduler parameter and/or the first shaper parameter.

Although embodiments are described above with respect to only one VNO in the first network using the example of FIG. 3, a skilled person should understand various embodiments may also apply to each one of the VNOs.

Specifically, the apparatus 200 may be further configured to perform the obtaining of the second parameter, the determining of the first scheduler parameter and the transmitting of the first scheduler parameter and/or the first shaper parameter, for respective ones of the VNOs.

Furthermore, the apparatus 200 may be further configured to repeat the obtaining of the first parameter; the obtaining of the second parameter, the determining of the first scheduler parameter and the transmitting of the first scheduler parameter and/or the first shaper parameter at predetermined time intervals.

The predetermined time interval for repetition may relate to how often the first parameter is updated.

Specifically, the time period for determining the first parameter may be lower than or equal to the predetermined time interval for repetition. Setting the time period for determining the first parameter equal to the predetermined time interval for repetition makes it easier to implement. If the time period for determining the first parameter is lower than the predetermined time interval for repetition, it would mean that more than one first parameter per repetition interval is available, and in this case, an additional logic, e.g. computing the mean, median, maximum or any percentile of the multiple contention indications may be applied to aggregate the multiple contention indications.

The apparatus 200 may be further configured to group the plurality of VNOs in the first network into a subset of heavy slices and a subset of normal slices.

A skilled person should know various ways of grouping VNOs into a subset of heavy slices and a subset of normal slices. For example, criteria like how often and for how long slices are hitting the maximum rate may be used for the grouping. For example, when the frequency of hitting the maximum rate of a slice is above a predetermined threshold, the slice may be determined as a heavy slice. In one embodiment, the apparatus 200 may be further configured to determine whether the respective VNO is a heavy slice or a normal slice based on the respective second parameter.

Furthermore, the apparatus 200 may be further configured to determine whether the respective VNO is a heavy slice or a normal slice based on the respective second parameter over respective time windows. For example, the apparatus 200 may determine a slice as a heavy slice, if the data volume consumed by the slice during certain time window exceeds a corresponding threshold.

The apparatus 200 may be further configured to determine the weight reduction amount for respective VNO in the subset of heavy slices as a minimum weight reduction amount that enables a successful speed test for a subscriber in a VNO in the subset of normal slices.

Figure 4:
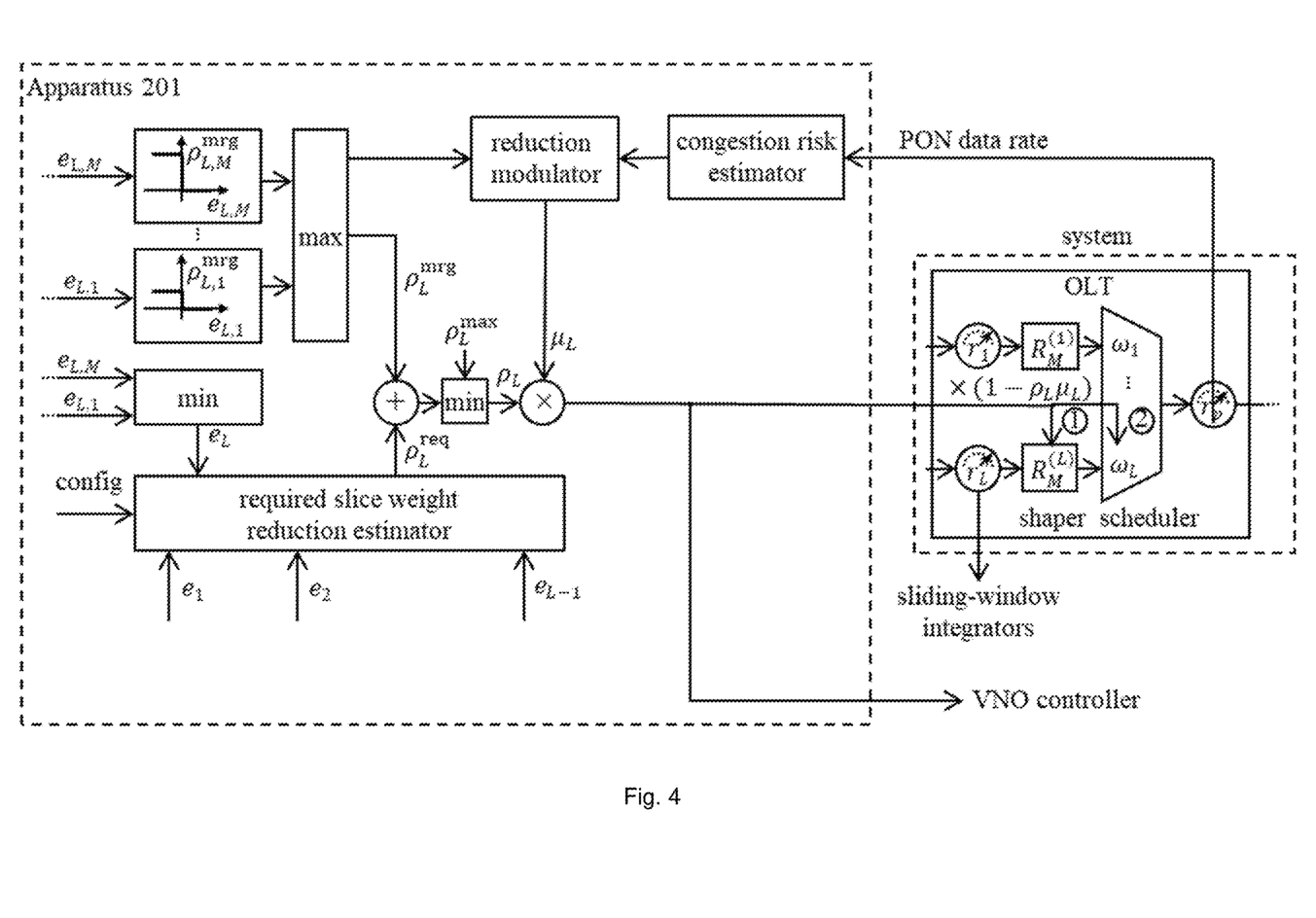
FIG. 4 shows a schematic block diagram of an example implementation according to one embodiment.

FIG. 4 shows a schematic block diagram of an example implementation according to one embodiment.

In the example shown in FIG. 4, the apparatus 201 may be a specific implementation of the apparatus 200 according to various embodiments. A skilled person shall understand only part of the functions of apparatus 201 is shown in FIG. 4. For simplicity, the similar functions as described above with respect to FIGS. 1 to 3 will not be repeated here. Furthermore, the time window integrators described with respect to FIG. 1 is omitted here. A skilled person should understand the historical bandwidth utilization of respective subscriber may be aggregated using similar time window integrators as described with respect to FIG. 1.

Using the example of FIG. 4, the operation of the apparatus 201 will be elaborated in detail for slice L. A skilled person shall understand that the description also applies to other slices.

Specifically, the data volume of slice L aggregated over different time windows may be compared with respective reference data volumes and the difference $e_{L,1} \ldots e_{L,M}$ may be provided for further processing in the apparatus 201.

As shown in FIG. 4, the apparatus 201 comprises a required slice weight reduction estimator. The function of the required slice weight reduction estimator will be elaborated below.

In the example shown in FIG. 4, $e_\sigma$ is defined as the minimum error signal for slice $\sigma$ over all time windows. Using this error signal $e_\sigma$ of every slice $\sigma=1,2,\ldots,L$, the estimator categorizes each slice as normal (nrm) or heavy (hvy). The set of all slices is defined as $\Sigma=\{1,2,\ldots,L\}$, the subset of normal slices as $\Sigma^{nrm}=\{\sigma\in\Sigma|e_\sigma\geq 0\}$, and the subset of heavy slices as $\Sigma^{hvy}=\{\sigma\in\Sigma|e_\sigma<0\}$. The set of all subscribers of a slice $\sigma$ is define as $S_\sigma=\{1,2,\ldots,N_\sigma\}$.

Specifically, in one example, the estimator may determine the required relative slice weight reduction $\sigma_\sigma^{req}$ to be applied to respective heavy slices as follows. The estimator ensures that any subscriber of any normal slice can run a successful speed test. As a first step to achieve this goal, the apparatus 200 may calculate the total MIRC $R_C^{nrm}$ for the subset of normal slices required to enable a specific subscriber $s_{tst}$ in a normal slice $\sigma_{tst}$ to perform a successful speed test. This speed test user transmits data at the rate $R_M^{(\sigma_{tst}, s_{tst})}$. All other users in the normal slices transmit data at an estimated rate of $r_{\sigma,s}^{nrm}=U_\sigma R_C^{(\sigma,s)}=U_\sigma \omega_\sigma \omega_{\sigma,s} C$ assuming normalized weights. The estimator calculates $R_C^{nrm}$ for all possible values for $\sigma_{tst}$ and $s_{tst}$, i.e., $\sigma_{tst}\in\Sigma^{nrm}$ and $s_{tst}\in S^{\sigma_{tst}}$ as below:

$$R_C^{nrm} = R_M^{(\sigma_{tst}, s_{tst})} + U_{\sigma_{tst}}\omega_{\sigma_{tst}}C\sum_{t\in S_{\sigma_{tst}}\setminus\{s_{tst}\}}\omega_{\sigma,t} + C\sum_{\tau\in\Sigma^{nrm}\setminus\{\sigma_{tst}\}}U_\tau\omega_\tau$$

The configuration data required by the estimator in FIG. 4 comprises for example the weight of respective slice, slice utilization $U_\sigma$, the data rate of the speed test user and the data rate of all other users in subset of the normal slices.

Next the estimator may determine the maximum MIRC $R_{C,max}^{nrm}$ over all possible values for $\sigma_{tst}$ and $s_{tst}$ as:

$$R_{C,max}^{nrm} = \max_{\sigma_{tst}\in\Sigma^{nrm}, s_{tst}\in S_{\sigma_{tst}}} R_C^{nrm}(\sigma_{tst}, s_{tst}).$$

If the subset of normal slices has a total MIRC of $R_{C,max}^{nrm}$, then any subscriber of any of the normal slices should be able to run a successful speed test. Next the estimator may calculate the original total MIRC for the subset of heavy slices as $R_{C,0}^{hvy}=C\Sigma_{\sigma\in\Sigma^{hvy}}\omega_\sigma$. Then using the required total MIRC for the subset of normal slices, the reduced total MIRC for the subset of heavy slices is determined as $R_C^{hvy}=C-R_{C,max}^{nrm}$. Using $R_{C,0}^{hvy}$ and $R_C^{hvy}$, the estimator calculates the required slice weight reduction $\rho_\sigma^{req}$ applicable to any heavy slice as defined in:

$$\forall \sigma \in \sum\nolimits^{hvy}: \rho_\sigma^{req} = \left(1 - \frac{R_C^{hvy}}{R_{C,0}^{hvy}}\right)\left(\frac{C - R_{C,0}^{hvy}}{C - R_C^{hvy}}\right)$$

Furthermore, as shown in the example of FIG. 4, after the required slice weight reduction $\rho_\sigma^{req}$ is determined, it is further used to determine the relative weight reduction amount of slice L.

Specifically, in an unsliced PON, the subscriber weight reduction is a static controller parameter configured upfront for every rule. In a sliced PON, however, the required slice weight reduction is dynamically calculated and independent of the rules. In this case the rules are merely used to categorize slices as normal or heavy. Nevertheless, FIG. 4 shows that each rule still includes a statically configured weight reduction $\rho_{\sigma,w}^{mrg}$. However, in the apparatus 201, the applicable configured weight reduction $\rho_\sigma^{mrg}$ is used as a margin added to the estimated required weight reduction $\rho_\sigma^{req}$. This margin is useful to cope with the estimation error and to differentiate slices according to the time during which their heavy usage lasts. After the margin is added, the total slice weight reduction $\rho_\sigma$ is capped to $\sigma_\sigma^{max}$ determined based on the slice CIR $R_A^{(\sigma)}$, i.e. $\rho_\sigma=\min(\rho_\sigma^{max}, \rho_\sigma^{req}+\rho_\sigma^{mrg})$. The relative weight reduction $\rho_\sigma$ may be provided to the output of the apparatus 201.

In other embodiments, the weight or an absolute weight reduction amount may be determined based on the required slice weight reduction $\rho_\sigma^{req}$ and provided to the output of the apparatus 201. In the example of FIG. 4, the output of the apparatus 201 is provided to the WFQ. The WFQ may adjust the bandwidth allocated to the slice L according to the output of the apparatus 201. Meanwhile, the output of the apparatus 201 is also provided to the controller of slice L and may be used by the controller of slice L for scheduling traffic for its own subscribers.

Specifically, similar as stated above with respect to the unsliced PON, the apparatus 300 may reduce the second scheduler parameter and/or the second shaper parameter for the subscriber, whose third parameter is above a respective second predetermined threshold corresponding to the respective time window.

As elaborated above with respect to FIG. 1, a rule may comprise a relative reduction, a time window and a second predetermined threshold related to the third parameter. In one example, the rule, especially the relative reduction to be applied to the second scheduler parameter and/or the second shaper parameter, may be adjusted based on the first scheduler parameter and/or the first shaper parameter received from the apparatus 200.

Figure 5:
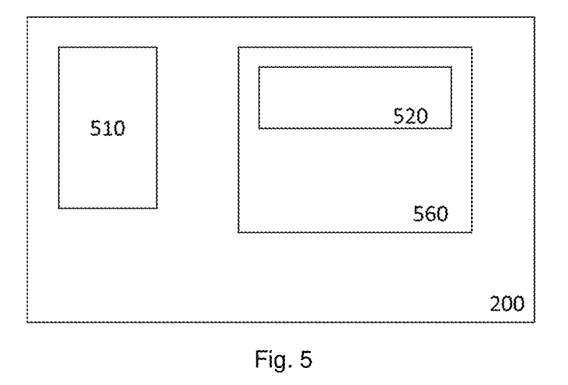
FIG. 5 shows a block diagram depicting the apparatus 200 operating in accordance with an example embodiment.

FIG. 5 is a block diagram depicting the apparatus 200 operating in accordance with an example embodiment.

The block diagram of FIG. 5 may apply to any of the above-described apparatus 201 and apparatus 300 as well. The apparatus 200 may be, for example, an electronic device such as a chip, chip-set, an electronic device or an access network controller. The apparatus 200 includes a processor 510 and a memory 560. In other examples, the apparatus 200 may comprise multiple processors.

In the example of FIG. 5, the processor 510 is a control unit operatively connected to read from and write to the memory 560. The processor 510 may also be configured to receive control signals received via an input interface and/or the processor 510 may be configured to output control signals via an output interface. In an example embodiment the processor 510 may be configured to convert the received control signals into appropriate commands for controlling functionalities of the apparatus.

The memory 560 stores computer program instructions 520 which when loaded into the processor 510 control the operation of the apparatus 200 as explained above. In other examples, the apparatus 200 may comprise more than one memory 560 or different kinds of storage devices.

Computer program instructions 520 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 comprises means, wherein the means comprises at least one processor 510, at least one memory 560 including computer program code 520, the at least one memory 560 and the computer program code 520 configured to, with the at least one processor 510, cause the performance of the apparatus 200.

Figure 6:
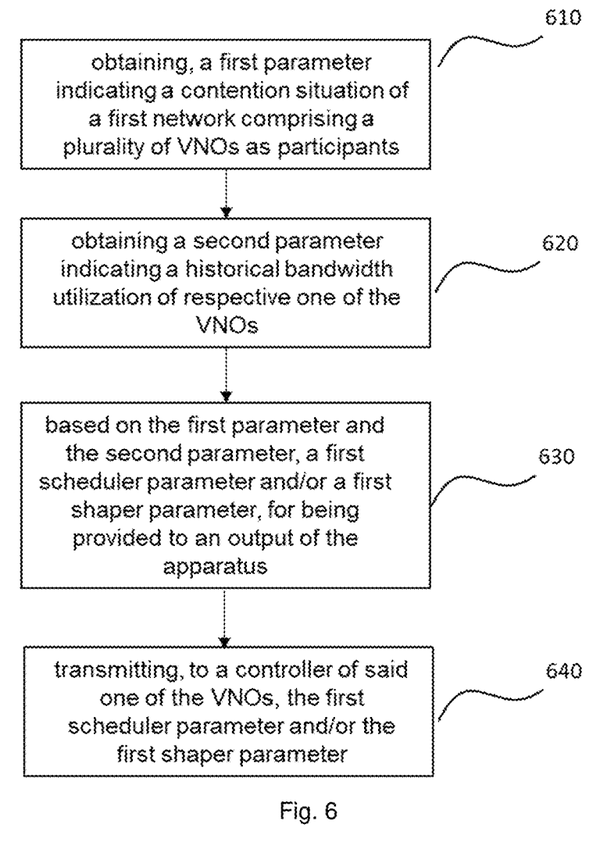
FIG. 6 shows an example method 600 incorporating aspects of the various embodiments.

FIG. 6 illustrates an example method 600 incorporating aspects of the various embodiments.

The method starts with step S610 obtaining a first parameter indicating a contention situation of a first network comprising a plurality of virtual network operators, VNOs, as participants. The method continues with step S620 obtaining, a second parameter indicating a historical bandwidth utilization of respective one of the VNOs. The method further continues with step S630 determining, based on the first parameter and the second parameter, a first scheduler parameter and/or a first shaper parameter, for being provided to an output of the apparatus, wherein the first scheduler parameter and/or the first shaper parameter is related to allocating bandwidth to said one of the VNOs. The method further continues with step S640 transmitting, to a controller of said one of the VNOs, the first scheduler parameter and/or the first shaper parameter.

A skilled person shall understand that the sequence of the method is not limited to the illustrated example. The method may be implemented in other sequence. For example, the first parameter and the second parameter may be obtained together in one step or the second parameter may be obtained prior to the first parameter.

Figure 7:
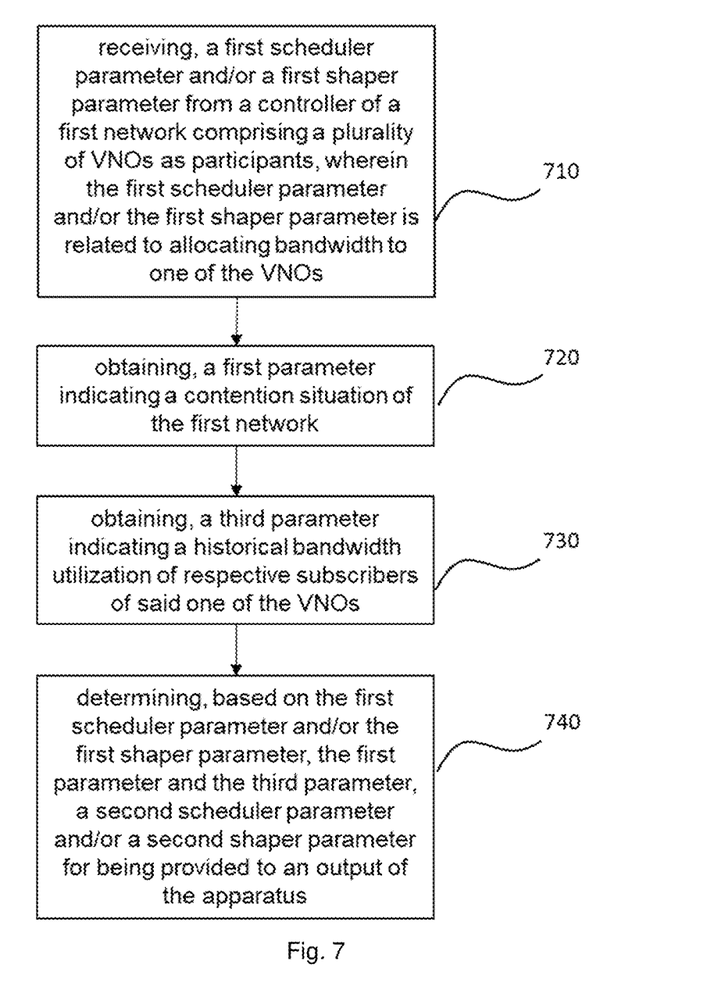
FIG. 7 shows an example method 700 incorporating aspects of the various embodiments.

FIG. 7 illustrates an example method 700 incorporating aspects of the various embodiments.

The method starts with step S710 receiving, a first scheduler parameter and/or a first shaper parameter from a controller of a first network comprising a plurality of virtual network operators, VNOs, as participants, wherein the first scheduler parameter and/or the first shaper parameter is related to allocating bandwidth to one of the VNOs; said one of the VNOs comprising a plurality of subscribers.

The method continues with step S720 obtaining, a first parameter indicating a contention situation of the first network. The method further continues with step S730 obtaining, a third parameter indicating a historical bandwidth utilization of respective one of the subscribers of said one of the VNOs. The method further continues with step S740 determining, based on the first scheduler parameter and/or the first shaper parameter, the first parameter and the third parameter, a second scheduler parameter and/or a second shaper parameter for being provided to an output of the apparatus, wherein, the second scheduler parameter and/or the second shaper parameter is related to allocating bandwidth to said one of the subscribers of said one of the VNOs.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   at least one memory configured to store instructions; and
   at least one processor configured to execute the instructions and cause the apparatus to perform,
   obtaining, a first parameter indicating a contention situation of a first network comprising a plurality of virtual network operators (VNOs) as participants;
   obtaining a second parameter indicating a historical bandwidth utilization of a respective VNO of the plurality of VNOs;
   determining whether the respective VNO is a heavy slice or a normal slice based on the second parameter;
   determining, based on the first parameter and the second parameter, at least one of a first scheduler parameter or a first shaper parameter, for being provided to an output of the apparatus, wherein the at least one of the first scheduler parameter or the first shaper parameter is related to allocating bandwidth to the respective VNO of the VNOs; and
   transmitting, to a controller of the respective VNO of the VNOs, the at least one of the first scheduler parameter or the first shaper parameter.

2. The apparatus according to claim 1, wherein the apparatus is further caused to perform the obtaining of the second parameter, the determining of the first scheduler parameter, and the transmitting of the at least one of the first scheduler parameter or the first shaper parameter, for each VNO of the plurality of VNOs.

3. The apparatus according to claim 2, wherein the apparatus is further caused to perform:
   grouping the plurality of VNOs in the first network into a subset of heavy slices and a subset of normal slices; and
   determining a weight reduction amount for a VNO in the subset of heavy slices as a minimum weight reduction amount that enables a successful speed test for a subscriber in a VNO in the subset of normal slices.

4. The apparatus according to claim 1, wherein the apparatus is further caused to perform:
   repeating the obtaining of the first parameter, the obtaining of the second parameter, the determining of the first scheduler parameter, and the transmitting of the at least one of the first scheduler parameter or the first shaper parameter at desired time intervals.

5. The apparatus according to claim 1, wherein
   the first scheduler parameter indicates a weight or a weight reduction amount corresponding to the respective VNO in the first network for use in a Weighted Fair Queue scheduler; and
   the first shaper parameter indicates a limit or a limit reduction amount of the bandwidth allocated to the respective VNO in the first network.

6. The apparatus according to the claim 1, wherein the apparatus is further caused to perform:
   obtaining the second parameter for the respective VNO over a plurality of time windows; and
   determining whether the respective VNO is the heavy slice or the normal slice based on the respective second parameter over the plurality of time windows.

7. The apparatus according to claim 1, wherein the controller of the respective VNO of the plurality of VNOs allocates bandwidth to subscribers of the respective VNO of the VNOs.

8. The apparatus according to the claim 1, wherein the apparatus is further caused to perform the determining whether the respective VNO is a heavy slice or a normal slice based on the second parameter by:
   determining whether the respective VNO is the heavy slice based on a frequency of the respective VNO hitting a maximum data rate and a desired threshold value.

9. The apparatus according to the claim 1, wherein the apparatus is further caused to perform the determining whether the respective VNO is a heavy slice or a normal slice based on the second parameter by:
   determining whether the respective VNO is the heavy slice based on a length of time that the respective VNO hits a maximum data rate and a desired threshold value.

10. An apparatus, comprising:
at least one memory configured to store instructions; and
at least one processor configured to execute the instructions and cause the apparatus to perform,
receiving, at least one of a first scheduler parameter or a first shaper parameter from a controller of a first network comprising a plurality of virtual network operators (VNOs) as participants, wherein the at least one of the first scheduler parameter or the first shaper parameter is related to allocating bandwidth to a respective VNO of the plurality of VNOs, the respective VNO of the plurality of VNOs including a plurality of subscribers;
obtaining a first parameter indicating a contention situation of the first network;
obtaining a third parameter indicating a historical bandwidth utilization of respective subscribers of the respective VNO of the plurality of VNOs;
determining whether the respective VNO is a heavy slice or a normal slice based on the third parameter; and
determining at least one of a second scheduler parameter or a second shaper parameter for being provided to an output of the apparatus based on the at least one of the first scheduler parameter or the first shaper parameter, the first parameter, and the third parameter, wherein, the at least one of the second scheduler parameter or the second shaper parameter is related to allocating bandwidth to one of the subscribers of the respective VNO of the plurality of VNOs.

11. The apparatus according to claim 10, wherein the first scheduler parameter indicates a weight or a weight reduction amount corresponding to the respective VNO in the first network for use in a Weighted Fair Queue scheduler, and the first shaper parameter indicates a limit or a limit reduction amount of the bandwidth allocated to the respective VNO in the first network.

12. The apparatus according to claim 10, wherein the second scheduler parameter indicates a weight or a weight reduction amount corresponding to a respective subscriber in the respective VNO of the plurality of VNOs for use in a Weighted Fair Queue scheduler, and the second shaper parameter indicates a limit or a limit reduction amount of the bandwidth allocated to the respective subscriber in the respective VNO of the plurality of VNOs.

13. The apparatus according to claim 10, wherein the apparatus is further caused to:
perform the obtaining of the third parameter and the determining of the second scheduler parameter, for each VNO of the plurality of VNOs;
transmit at least one of the second scheduler parameter or the second shaper parameter, for each VNO of the plurality of VNOs;
group the plurality of VNOs in the first network into a subset of heavy slices and a subset of normal slices; and
determine a weight reduction amount for a VNO in the subset of heavy slices as a minimum weight reduction amount that enables a successful speed test for a subscriber in a VNO in the subset of normal slices.

14. The apparatus according to the claim 10, wherein the apparatus is further caused to perform:
obtaining the third parameter for the respective VNO over a plurality of time windows; and
determining whether the respective VNO is the heavy slice or the normal slice based on the respective third parameter over the plurality of time windows.

15. A method, comprising:
obtaining a first parameter indicating a contention situation of a first network comprising a plurality of virtual network operators, (VNOs), as participants;
obtaining a second parameter indicating a historical bandwidth utilization of a respective VNO of the plurality of VNOs;
determining whether the respective VNO is a heavy slice or a normal slice based on the second parameter;
determining, based on the first parameter and the second parameter, at least one of a first scheduler parameter or a first shaper parameter, wherein the at least one of the first scheduler parameter or the first shaper parameter is related to allocating bandwidth to the respective VNO of the plurality of VNOs; and
transmitting, to a controller of the respective VNO of the plurality of VNOs, the at least one of the first scheduler parameter or the first shaper parameter.

16. The method according to claim 15, wherein
the obtaining of the second parameter, the determining of the first scheduler parameter, and the transmitting of the at least one of the first scheduler parameter or the first shaper parameter, is performed for each VNO of the plurality of VNOs; and
the method further includes,
grouping the plurality of VNOs in the first network into a subset of heavy slices and a subset of normal slices; and
determining a weight reduction amount for a VNO in the subset of heavy slices as a minimum weight reduction amount that enables a successful speed test for a subscriber in a VNO in the subset of normal slices.

17. The method according to claim 15, further comprising:
obtaining the second parameter for the respective VNO over a plurality of time windows; and
determining whether the respective VNO is the heavy slice or the normal slice based on the respective second parameter over the plurality of time windows.

18. A method, comprising:
receiving at least one of a first scheduler parameter or a first shaper parameter from a controller of a first network comprising a plurality of virtual network operators (VNOs) as participants, wherein the at least one of the first scheduler parameter or the first shaper parameter is related to allocating bandwidth to a respective VNO of the plurality of VNOs, the respective VNO of the plurality of VNOs comprising a plurality of subscribers;
obtaining a first parameter indicating a contention situation of the first network;
obtaining a third parameter indicating a historical bandwidth utilization of respective subscribers of the respective VNO of the plurality of VNOs;
determining whether the respective VNO is a heavy slice or a normal slice based on the third parameter; and
determining at least one of a second scheduler parameter or a second shaper parameter based on the at least one of the first scheduler parameter or the first shaper parameter, the first parameter, and the third parameter, wherein the at least one of the second scheduler parameter or the second shaper parameter is related to allocating bandwidth to one of the subscribers of the respective VNO of the plurality of VNOs.

19. The method according to claim 18, wherein
the obtaining of the third parameter and the determining of the second scheduler parameter is performed for each VNO of the plurality of VNOs; and
the method further includes,
   transmitting of at least one of the second scheduler parameter or the second shaper parameter for each VNO of the plurality of VNOs;
   grouping the plurality of VNOs in the first network into a subset of heavy slices and a subset of normal slices; and
   determining a weight reduction amount for a VNO in the subset of heavy slices as a minimum weight reduction amount that enables a successful speed test for a subscriber in a VNO in the subset of normal slices.

20. The method according to claim 18, further comprising:
   obtaining the third parameter for the respective VNO over a plurality of time windows; and
   determining whether the respective VNO is the heavy slice or the normal slice based on the respective third parameter over the plurality of time windows.

* * * * *